(12) United States Patent
Labrecque et al.

(10) Patent No.: US 7,210,590 B2
(45) Date of Patent: May 1, 2007

(54) TRANSPORTATION CART PRIMARILY FOR USE IN AN ANIMAL BARN

(75) Inventors: Robert Labrecque, St. Bernard de Dorchester (CA); Ghyslain Labrecque, St. Bernard de Dorchester (CA); Germain Labrecque, St. Bernard de Dorchester (CA)

(73) Assignee: Conception Ro-Main Inc., St. Bernard de Dorchester, Quebec (CA)

( * ) Notice: Subject to any disclaimer, the term of this patent is extended or adjusted under 35 U.S.C. 154(b) by 173 days.

(21) Appl. No.: 10/819,370

(22) Filed: Apr. 7, 2004

(65) Prior Publication Data
US 2005/0224440 A1 Oct. 13, 2005

(51) Int. Cl.
*B60P 1/54* (2006.01)

(52) U.S. Cl. ............... 212/301; 212/180; 212/901; 414/543; 414/544

(58) Field of Classification Search .......... 212/180, 212/301, 901; 414/538, 543, 5, 544
See application file for complete search history.

(56) References Cited

U.S. PATENT DOCUMENTS

| | | | | |
|---|---|---|---|---|
| 2,258,289 A | * | 10/1941 | Wallace | 414/23 |
| 2,609,951 A | * | 9/1952 | Daniels | 414/487 |
| 3,103,288 A | * | 9/1963 | Pruss | 298/8 T |
| 3,165,217 A | * | 1/1965 | Harris et al. | 414/633 |
| 3,225,949 A | * | 12/1965 | Erickson et al. | 414/629 |
| 3,269,744 A | * | 8/1966 | Dobson | 280/43.17 |
| 3,458,074 A | * | 7/1969 | Railey | 414/479 |
| 3,931,957 A | * | 1/1976 | Thibodeaux | 254/127 |
| 4,052,080 A | | 10/1977 | Hedderich et al. | |
| 4,240,773 A | * | 12/1980 | Terry | 410/47 |
| 4,431,363 A | * | 2/1984 | Waite | 414/687 |
| 4,435,115 A | | 3/1984 | Orstad et al. | |
| 4,700,852 A | * | 10/1987 | Mjoberg | 212/231 |
| 5,029,884 A | | 7/1991 | Maendel | |

(Continued)

FOREIGN PATENT DOCUMENTS

FR    75 37172    *    7/1977

(Continued)

*Primary Examiner*—Thomas J Brahan
(74) *Attorney, Agent, or Firm*—Adrian D. Battison; Michael R. Williams; Ryan W. Dupuis

(57) ABSTRACT

A transportation cart primarily for transporting deceased animals through the alleyways of a barn has a swivelling mast and boom mounted on the front section of a frame driven by powered wheels with a slide panel attached to the mast below the boom over which the object can slide as it is pulled by actuating a winch to be carried. A coupling is provided between the front frame section and a rear frame section with castor wheels for providing side to side movement of the rear frame section relative to the front frame section transverse to a longitudinal center line to provide ballast when the lifting is to one side and to provide manoeuvrability. The boom has an inner end mounted on the mast for pivotal movement about a transverse axis such that an outer end of the boom can be raised and lowered and the slide panel is movable from its inclined slide position below the boom to a raised stored position attached to an underside of the boom.

19 Claims, 8 Drawing Sheets

U.S. PATENT DOCUMENTS

| | | | |
|---|---|---|---|
| 5,485,691 A * | 1/1996 | Stevens et al. | 37/302 |
| 6,550,746 B2 | 4/2003 | Drost | |
| 6,564,955 B2 * | 5/2003 | Franzen et al. | 212/301 |
| 6,604,749 B2 | 8/2003 | Woodbury | |
| 6,692,218 B2 * | 2/2004 | Grile | 414/563 |

FOREIGN PATENT DOCUMENTS

| | | |
|---|---|---|
| FR | 2657339 | 7/1991 |
| FR | 2607076 | 5/1998 |

* cited by examiner

TRANSPORTATION CART PRIMARILY FOR USE IN AN ANIMAL BARN

This invention relates to a transportation cart which is primarily designed for use in an animal barn particularly for lifting and transportation of deceased animals through the alleys of the barn. However the transportation cart can be used not only for other lifting and transportation functions within a barn but also as a multi-purpose lifting system in other areas such as in industrial or automotive fields.

BACKGROUND OF THE INVENTION

The lifting of objects in confined areas is often difficult. One particular area where space is limited is that in the raising of animals in a barn where the alleyways have a width which is kept to a minimum in order to maximize the space available for housing the animals. The alleyways are generally designed to be sufficient merely to allow transfer of walking animals from place to place and for the operator to walk.

A particular problem arises when an animal dies while in one of the pens since the animal must be lifted and transported from the pen to a position for disposal of the carcass.

Other lifting actions are necessary in animal husbandry barns for lifting equipment and other elements on an occasional basis.

A number of previous devices have been developed for transporting deceased animals in the relatively narrow confinements of an animal husbandry barn. Examples are as follows:

U.S. Pat. No. 4,052,080 (Hedderich) issued Oct. 4, 1977 discloses a two wheel cart which can be manually pulled and includes a generally channel shaped slide panel onto which the animal carcass is pulled by a winch adjacent the handle. The device is relatively simple and thus has significant difficulty in lifting the very heavy animals which are often necessary to lift, bearing in mind that animals are becoming heavier due to enhanced breeding conditions.

U.S. Pat. No. 4,435,115 (Orstad) issued Mar. 6, 1984 discloses a four wheel cart again having a winch so that the dead animal can be pulled onto a horizontal base of the cart by lifting the upper end of the animal. Again the device is relatively simple so that the amount of lifting force available is relatively low.

U.S. Pat. No. 5,029,884 (Maendel) issued Jul. 9, 1991 discloses a two wheel hand cart with sides while sliding the animal onto a support plate between the sides pulled by a hand winch at the upper part of the cart.

U.S. Pat. No. 6,604,749 (Woodbury) issued Aug. 12, 2003 discloses a four wheel cart with a slide panel extending downwardly to the ground so that the animal can be pulled over the slide panel onto the horizontal support surface of the cart and then the cart is simply pulled by a handle at the front which steers the front wheels. Again the lifting force available is limited.

U.S. Pat. No. 6,550,746 (Brost) issued Apr. 22, 2003 discloses an overhead winch carried on a track over the pens for lifting the animal vertically away from the pens and transporting the animal overhead. This arrangement is unsatisfactory since it requires overhead supports and sufficient room available between the pens and the ceiling so that it is highly limited in its ability to remove animals.

SUMMARY OF THE INVENTION

It is one object of the invention to provide an improved transportation cart.

According to one aspect of the invention there is provided a transportation cart comprising:

a cart frame;

ground wheels for carrying the frame over a ground surface;

at least one of the wheels being steerable for directing the cart to a required location;

a lifting mechanism on the frame for lifting an object from the ground to a raised position;

a slide panel below the lifting mechanism over which the object can be pulled to a lifted position and on which the object can be carried;

the lifting mechanism and the slide panel being mounted on a lift support which is rotatable relative to the cart frame with the lifting mechanism and the slide panel about an upstanding axis to allow lifting of the object from different positions around the frame.

The cart is preferably motor driven to accommodate heavy loads with ease but in some cases a manual cart propelled by operator pushing or other propelling action may be provided.

The steering effect can be controlled by the operator actively steering one or more operable wheels but may be controlled simply by an operator guiding movement of the cart while walking along with the cart using castor wheels to push the cart into the required direction. When an active steering action is provided, the operator may be provided with a seat, which may be collapsible or foldable, at a rear of the structure for riding while controlling the movement of the cart. The active steering can be provided on one wheel or two wheels preferably on a rear frame section using well known steering action. Outrigger castor wheels can be used when a single steered wheel is used for increased stability.

One important aspect of the cart is that it is motor driven allowing heavy loads to be moved with relative ease.

Preferably the lift support comprises a horizontal platform which is mounted on a horizontal base for sliding rotation about an axis at right angles to the base.

Preferably the lift support is rotatable through at least 180 degrees from one side to the other side so as to allow lifting from a position at said one side and to allow lifting from a position at said other side.

Preferably the lift support is lockable in three or more positions including at least a straight ahead position and said two side positions thus allowing the cart while in an alley to operate straight ahead or to each side as selected by the operator. Locking at multiple positions allows the device to operate at convenient angles for lifting at required positions around the axis of the mast.

Preferably the lift support is rotatable manually in order to provide a construction which has simple power requirements.

Preferably the lift mechanism comprises a generally upstanding mast and a boom having an inner end mounted on the mast for pivotal movement about a transverse axis such that an outer end of the boom can be raised and lowered.

Preferably the slide panel is attached to the mast and is inclined downwardly and outwardly therefrom.

Preferably the slide panel is pivotal from the lowered operating position below the boom to a raised stored position attached to an underside of the boom so as to be movable therewith.

Preferably the lift mechanism includes a winch mounted on the mast and having a cable extending to the outer end of the boom.

Preferably the boom is pivotal by actuation of a hand crank so as to provide an arrangement with simple power requirements. The boom may be operated manually or by an electric motor preferably driven by electricity from the same battery power supply which drives the motion of the cart. In this arrangement, the boom may be driven in its pivotal movement by actuation of a screw driven by hand ratchet or by an electric motor.

Preferably the frame includes a front frame section on which the lifting mechanism is mounted and a rear frame section and there is provided a coupling between the front frame section and the rear frame section for providing side to side movement of the rear frame section relative to the front frame section transverse to said longitudinal line of movement.

Preferably the coupling comprises a parallel linkage defined by a pair of arms connected between the front and rear frame sections which pivot side to side. This has the advantage that the movement to the side also provides forward movement thus improving manoeuvrability. However the side to side movement may be provided by a slide mechanism.

The side to side movement of the rear frame section is provided primarily for added manoeuvrability of the cart to allow negotiation of tight corners and through narrow areas. However the side to side movement also can be used to provide an increased stability of the cart during lifting to one side, by increasing the width of the wheel base and moving a rear wheel outwardly at the lifting action.

This enhanced stability can be yet further increased by providing increased weight for balance in the rear frame section in replacement for or in addition to the batteries stored therein. Yet further or additional stability can also be provided by adding weight at the base of the mast on the platform.

Preferably the coupling is lockable in three or more positions defining a center position in which the rear frame section is aligned behind the front frame section and two respective side positions. Multiple locking positions provide an increased ability to arrange the structure for lifting at different angles.

Preferably the front frame section is supported on two front wheels each on a respective side of a center line and the rear frame section is supported on two rear wheels each on a respective side of a center line.

Preferably the front wheels are the driven wheels so as to better drive the load carried on the front frame section.

Preferably the rear wheels are castor wheels which provide the steering action in a simple manner.

Preferably the rear frame section includes a control assembly arranged to be operated by an operator walking behind the rear frame section. The control assembly may Preferably there are provided electric power batteries carried on the rear frame section for ballast, which is moved to one side when the lifting action is to that side.

Preferably the rear frame section includes a foot step on which an operator can place weight for applying additional ballast.

According to a second aspect of the invention there is provided a transportation cart comprising:

a cart frame;

ground wheels for carrying the frame over a ground surface;

at least one of the wheels being steerable for directing the cart to a required location;

a lifting mechanism on the frame for lifting an object from the ground to a raised position;

a slide panel having an operating position below the lifting mechanism in which position the object can be pulled in a sliding action over the slide panel to a lifted position and on which the object can be carried;

the lifting mechanism including a boom having an inner end mounted on a lift support for pivotal movement about a transverse axis such that an outer end of the boom can be raised and lowered;

the slide panel being movable from the lowered operating position below the boom to a raised stored position attached to an underside of the boom so as to be movable therewith.

The slide panel can also be removed by pulling the pin if the cart is to be used primarily in functions which do not require the slide panel.

According to a third aspect of the invention there is provided a transportation cart comprising:

a cart frame;

ground wheels for carrying the frame over a ground surface along a longitudinal line of movement of the frame;

at least one of the wheels being steerable for directing the cart from the longitudinal line of movement to a required location;

a lifting mechanism on the frame for lifting an object from the ground to a raised position;

the frame including a front frame section on which the lifting mechanism is mounted and a rear frame section;

and a coupling between the front frame section and the rear frame section for providing side to side movement of the rear frame section relative to the front frame section transverse to said longitudinal line of movement.

The cart thus provided in this invention may have a boom which is at a fixed angle or may be pivotal about its inner end for raising and lowering an outer end. The cart may also have a mast which can rotate around its vertical axis or which is located at a fixed angle. The cart can also be formed with the articulation of the rear frame section for high manoeuvrability or may be manufactured without such articulation when to be used in a less confined situation.

Some or all of the various optional movements of the cart, that is the propulsion, the rotation of the lifting assembly, the movement of the boom, the winch and the articulation can be operated by manual power or driven by electric or other propulsion system as required. Electric power is convenient and simple using batteries carried on the cart. But power from an internal combustion engine or other known power source could also be used.

The cart can also be used with various different attachments which are carried on or used with the lifting mechanism to enhance lifting action with different objects which provide other lifting problems, such as forks for lifting pallets and restraints for lifting barrels and the like which are known to one skilled in the art.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
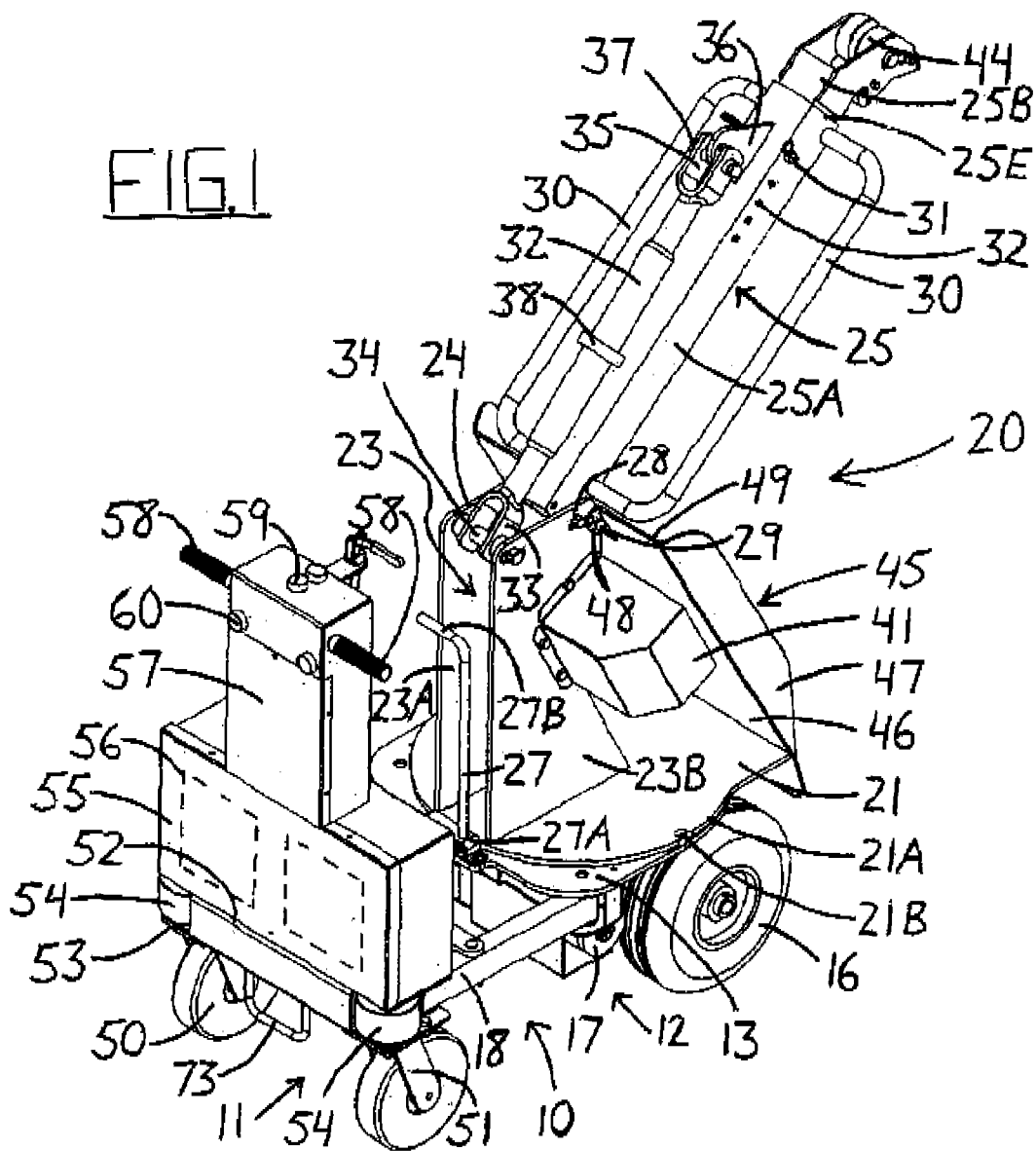
FIG. 1 is an isometric view from the rear and one side of a cart according to the present invention.

The cart shown in the figures comprises a frame generally indicated at 10 including a rear frame section 11 and a front frame section 12. The front frame section 12 includes a main plate 13 which is horizontal and is carried on underlying supporting frame members 14 including an axle 15. The axle 15 carries two ground wheels 16 which are driven by a motor 17 carried on the underside of the plate 13.

A suitable drive mechanism from the motor to the wheels is provided which can drive both wheels or only one of the wheels as required. When cornering, one of the wheels may be disconnected so as to provide a differential action to allow the cart to turn to the required direction. The motor is arranged to drive the wheels in the forward or reverse direction as required. Suitable drive arrangements are well known to one skilled in the art.

At the rear of the plate 13 is provided a cross member 14 which defines a channel for receiving the end of a pair of coupling arms 18 and 19 interconnecting the front and rear frames.

The plates 13 define a platform for a rotating lifting mechanism generally indicated at 20. The rotating lifting mechanism comprises a base plate 21 which is mounted on the plate 13 for rotation around a pivot coupling 22 at the center of the plates. This coupling defines therefore vertical axis about which the lift mechanism 20 can rotate. On top of the base plate 21 is mounted a mast 23 which stands upwardly to a raised upper end 24 at which is mounted a boom 25. The mast 23 is formed from two side plates 23A and 23B which are parallel and welded to the base plate 21 so as to stand vertically upwardly therefrom spaced apart either side of the pivot coupling 22.

The base plate 21 can rotate through 180° around the pivot coupling 22. Notches are provided as locking points in the edge of the plate 21 with that part of the edge indicated at 21A being circular around the vertical pivot axis. Three notches are shown but it will be appreciated that more may also be provided for multiple locking points. Two of the notches are visible at 21B and 21C and a third of the notches is shown in a position cooperating with a locking rod 27 which can be manually lifted to allow manual rotation of the base plate 21 around the pivot coupling 22 and can be manually lowered into a respective one of the notches to lock the plate at the required position.

Figure 2:
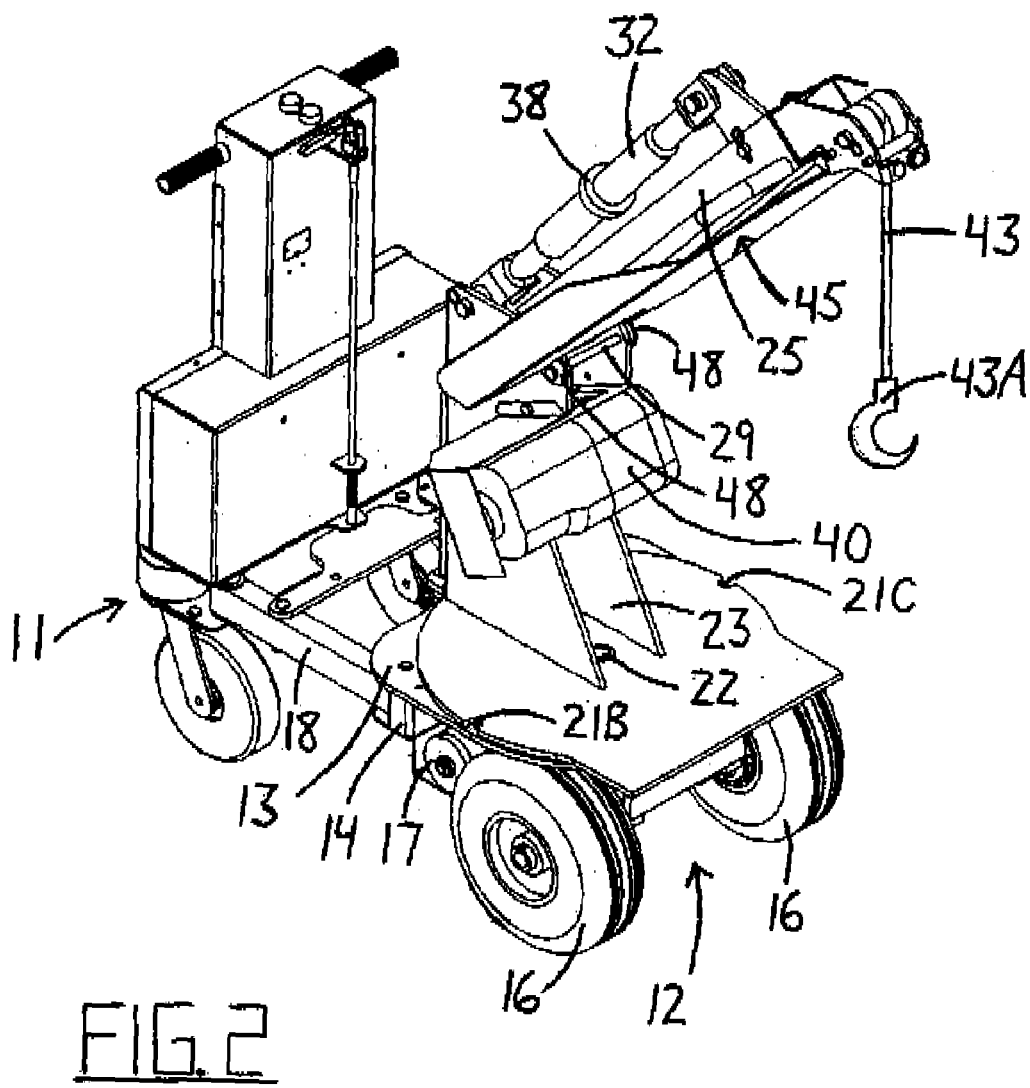
FIG. 2 is an isometric view from the front and one side of the cart of FIG. 1.

In the positions shown in FIGS. 1 and 2, the base plate is arranged in a straight ahead position so that the lift mechanism is arranged along a centre line of the cart. It will be appreciated that rotation of the base plate to move the notch 21B to the locking rod 27 will cause the base plate and the lift mechanism to be rotated through 90° to one side. Symmetrically the notch 21C allows the base plate of this mechanism to be rotated to the other side.

The lock rod 27 is of a type which is spring biased into engagement with the notch and is carried in a mounting 27A which defines a support for the lock rod and the spring biasing action. A handle 27B at the upper end of the lock rod allows it to be lifted from its spring engagement with the respective notch and drop back into the notch when required.

The boom 25 is mounted on a pivot pin 28 at the upper end of the mast 23. The pin 28 is located at a forward part of the upper end of the mast.

The boom 25 comprises a rectangular tube 25A with an outer end 25B spaced away from the mast at a lower end of the tube mounted on the pin 28. On each side of the tube 25A is mounted a respective bar or pipe 25B in parallel to the tube 25A and spaced outwardly away from the tube so as to provide an elongate supports which provide side to side support for an object carried by the boom while resting against the boom.

The boom further includes an inside tube 30 which can slide longitudinally inside the outside tube 25A so as to increase the length of the boom. The inside and outside tubes are locked together by a transverse pin 31 which can be inserted through selected ones of a series of holes 32 which are aligned between the inner and outer tubes.

The angle of the boom about the pivot pin 28 is adjusted by a screw 32 which is coupled at its rear end by a clevis fastening 33 to a pin 34 extending across the two plates defining the mass. The screw has a forward end including a clevis mounting 35 which attaches to a lug 36 on the upper part of the tube. Thus increasing and decreasing the length of the screw 32 changes the spacing between the pin 34 and the mounting pin 37. As the pin 34 is spaced rearwardly from the pivot pin 28, the boom is pivoted around the pin 28 by actuation of the screw. The screw is rotated by a ratchet and lever arrangement 38 on the outside of the screw. Screws of this type are readily available to one skilled in the art. The use of the screw allows the movement of the boom to be effected with power, either manual or the readily available electric power but without the necessity for the supply of hydraulic fluid or the like. The crank 38 allows the user to apply sufficient power to provide a lifting action if required but it is primarily intended that the main lifting action is effected using the high mechanical advantage of the winch and the movement of the boom is normally not under high load.

Figure 7:
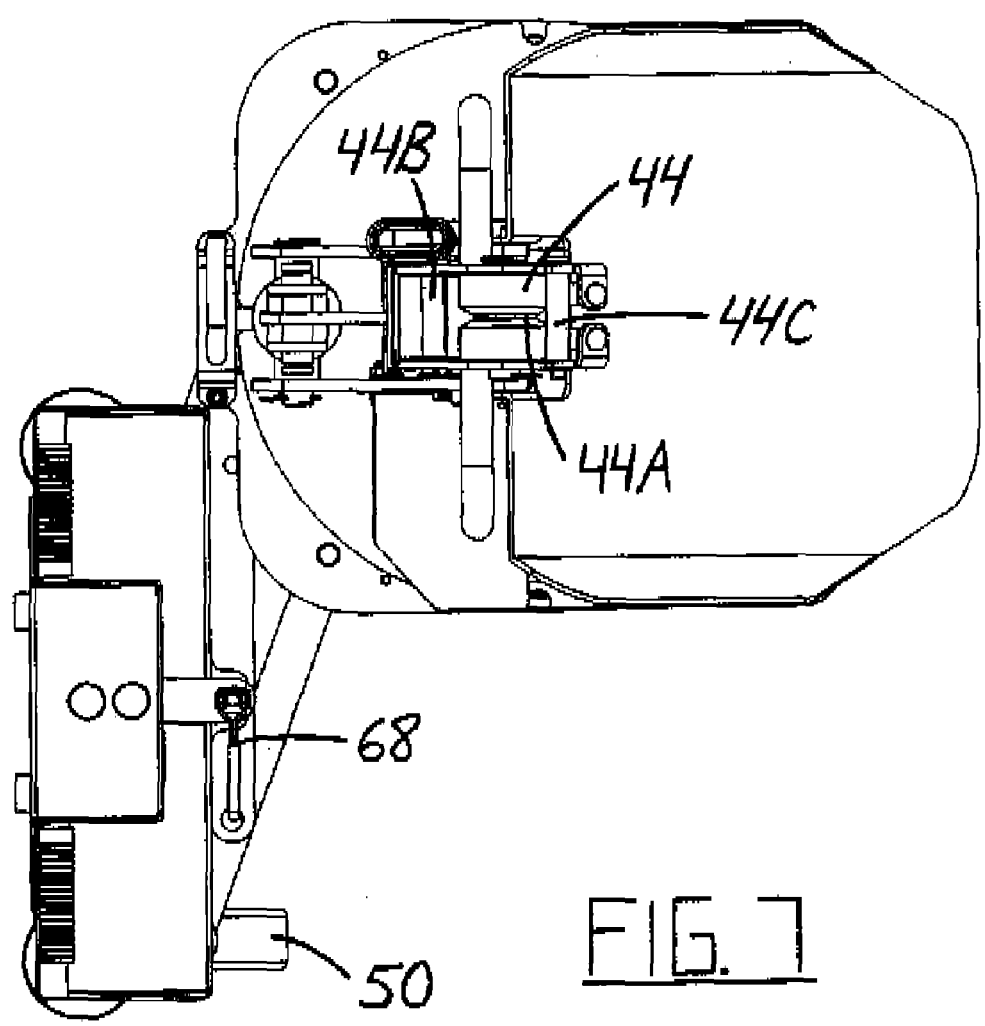
FIG. 7 is a top plan view of the cart with the rear frame section articulated to one side.
Figure 8:
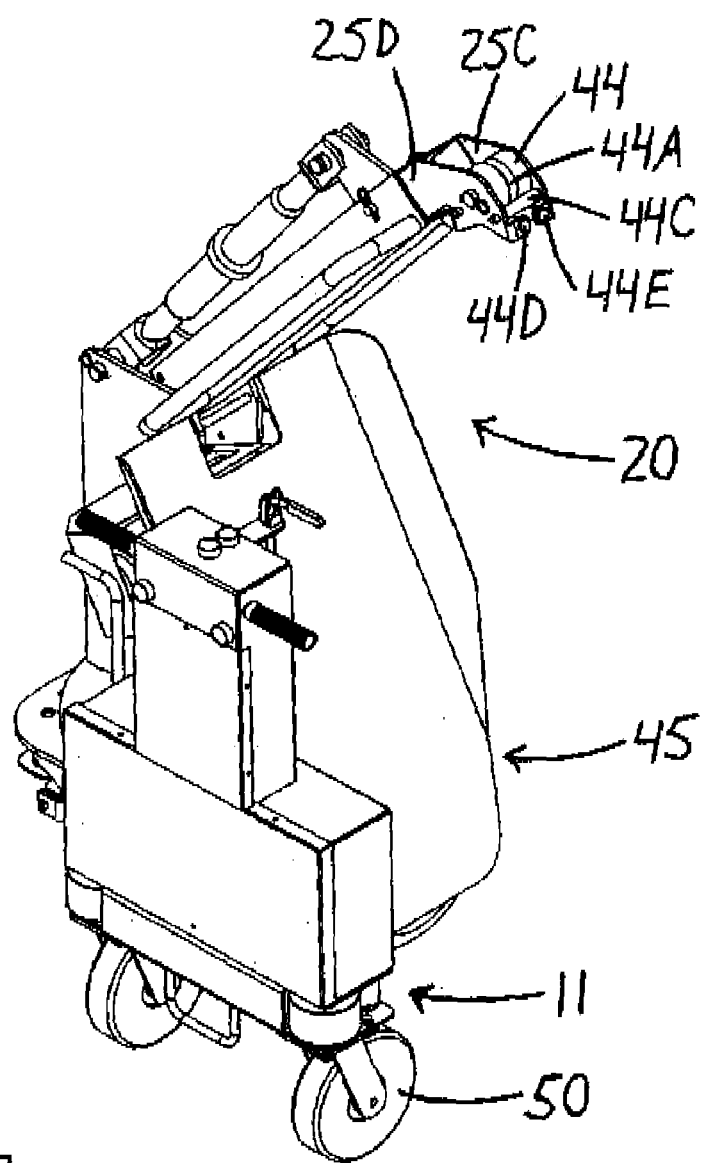
FIG. 8 is an isometric view of the cart with the rear frame section articulated to one side and the lifting assembly rotated to that one side.

A winch 40 is mounted on the mast between the plates 23A and 23B and including a motor projecting outwardly into an additional housing 41 carried on the plate 23B. The winch provides a cable 43 which extends along the interior of the tube from the mast to a pulley block 44 at the upper end of the mast over which the cable 43 passes so that it can hang down from the upper end of the mast to carry a conventional lifting hook 45 or similar device. As best shown in FIGS. 7 and 8, the pulley block 44 includes a central guide groove 44A. Behind the pulley 44 within the tube 25B is provided a transverse guide roller 44B. In front of the pulley is provided a further guide roller 44C which bridges the side plates 25C and 25D at the outer end of the inside tube 25B which carry the pulley 44. the guide rollers 44B and 44C act to hold the cable in the groove 44A. in addition two rollers 44D and 44E are arranged underneath the roller 44C each on a respective side and acting to confine the cable against side to side movement on the groove 4A. Thus if a lifting action applies a force to one side of the boom, the cable is wrapped partly around the respective roller 44D 44E and the forces are transferred to that roller without tending to pull the cable out of the groove or to apply wearing forces to the cable.

Thus the lifting action of the lifting mechanism is provided either by pivotal action of the boom on the mast or by actuating the winch and cable with the boom in a fixed position, primarily the latter.

Figure 6:
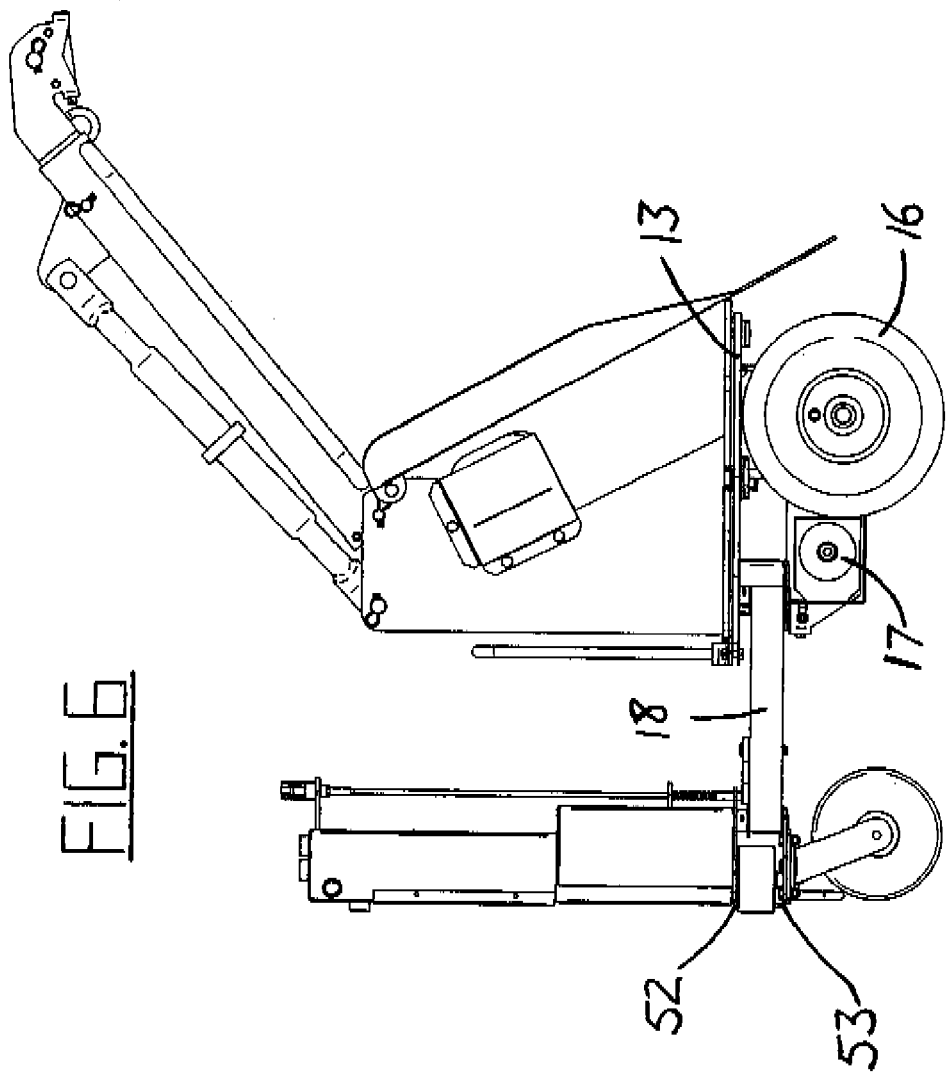
FIG. 6 is a side elevational view of the cart in the position of FIG. 1.

The lifting mechanism further includes a slide panel 45. This comprises a flat base panel 46 and two side edges 47 which are inclined upwardly and outwardly from the base panel 46. The slide panel thus in effect defines a channel onto which an object such as a deceased animal can be pulled so as to lie basically on the flat panel 46 but confined by the upturned side edges 47. The panel 45 includes a pair of rear lugs 48 on the backside at the top edge 49 and these lugs are pivotally mounted on a transverse pin 29 carried on the mast just in front of the pin 28. Thus the slide plate in its normal operating position is inclined downwardly and forwardly from the upper part of the mast to the base plate 21. The front edge 21D of the base plate 21 is straight across in front of the wheels so that the backside of the slide panel 45 rests against the transverse straight edge 21D thus holding the panel in its operating inclined position first shown in FIG. 6.

The slide panel 45 can also be moved to a raised position shown in FIG. 2 in which it is located underneath the boom and is attached to the underside of the tube 25 by a latch (not shown). When in the raised position underneath the boom, the slide panel is out of the way of lifting other elements which can be lifted from the ground directly vertically in front of the edge 21D. The close location of the pivot pins 28 and 29 ensure that the boom can pivot around the pin 28 while carrying the panel 45.

The rear frame 11 is mounted on castor wheels 50 carried on castors 51. The rear frame thus includes a base plate 52 which is at a common height with the base plate 13 of the front frame so that the arms 18 and 19 extend across underneath the plates 13 and 52 to interconnect the front and rear frames of the coupling therebetween. A rail 53 is mounted underneath the plate 52 so as to provide a channel within which the arms 18 and 19 extend. Bumper rollers 54 are provided at the ends of the plate 53 and rotatable about vertical axes so as to rub against any obstructions against which the rear frame impacts during movement of the cart through the narrow alleyways.

On top of the plate 52 is mounted a container 55 for two batteries 56 which provide power to the motor 17 and to the winch 40. When required, the batteries can also provide power to motors driving rotation of the mast, pivoting of the boom and articulation of the frame sections as described hereinafter. On top of the housing 55 is provided a container 57 for the electronics components which control the operation of the device. The container 57 has at its upper end a pair of handles 58 each extending out to a respective side of the container so that the operator can stand behind the rear frame and walk with the cart as it is moving either forwardly or rearwardly dependant upon the direction of drive of the motor 17. The winch 40 is operated by control buttons 59 which operate the winch in either direction. The forward and rearward movement of the motor 17 is controlled by buttons 60. A seat may be provided on the rear surface of the container which is foldable to allow the operator to ride. In this case the steering may be actively controlled by a linkage rather than by castors.

Figure 4:
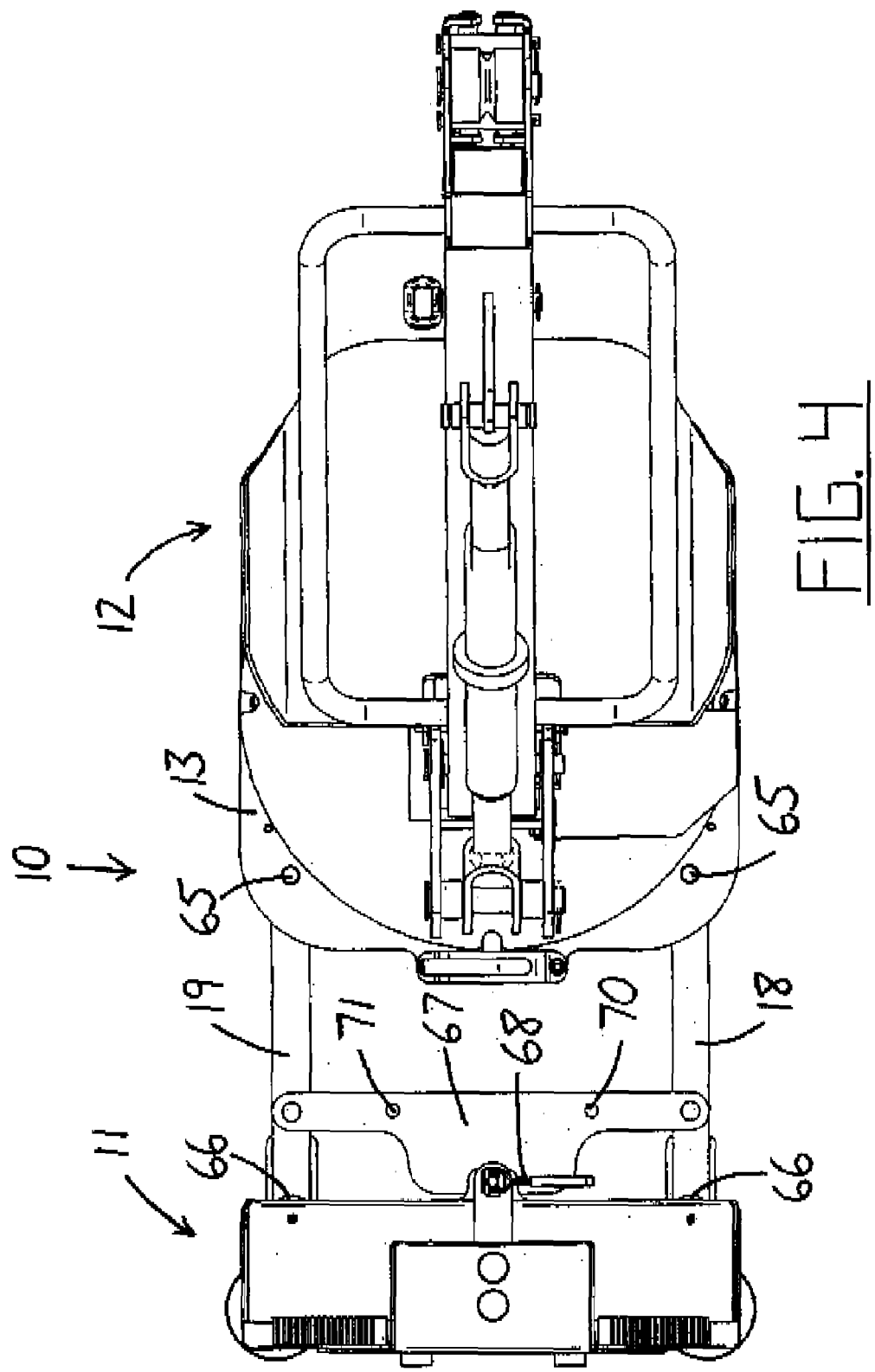
FIG. 4 is a top plan view of the cart in the position of FIG. 1.
Figure 5:
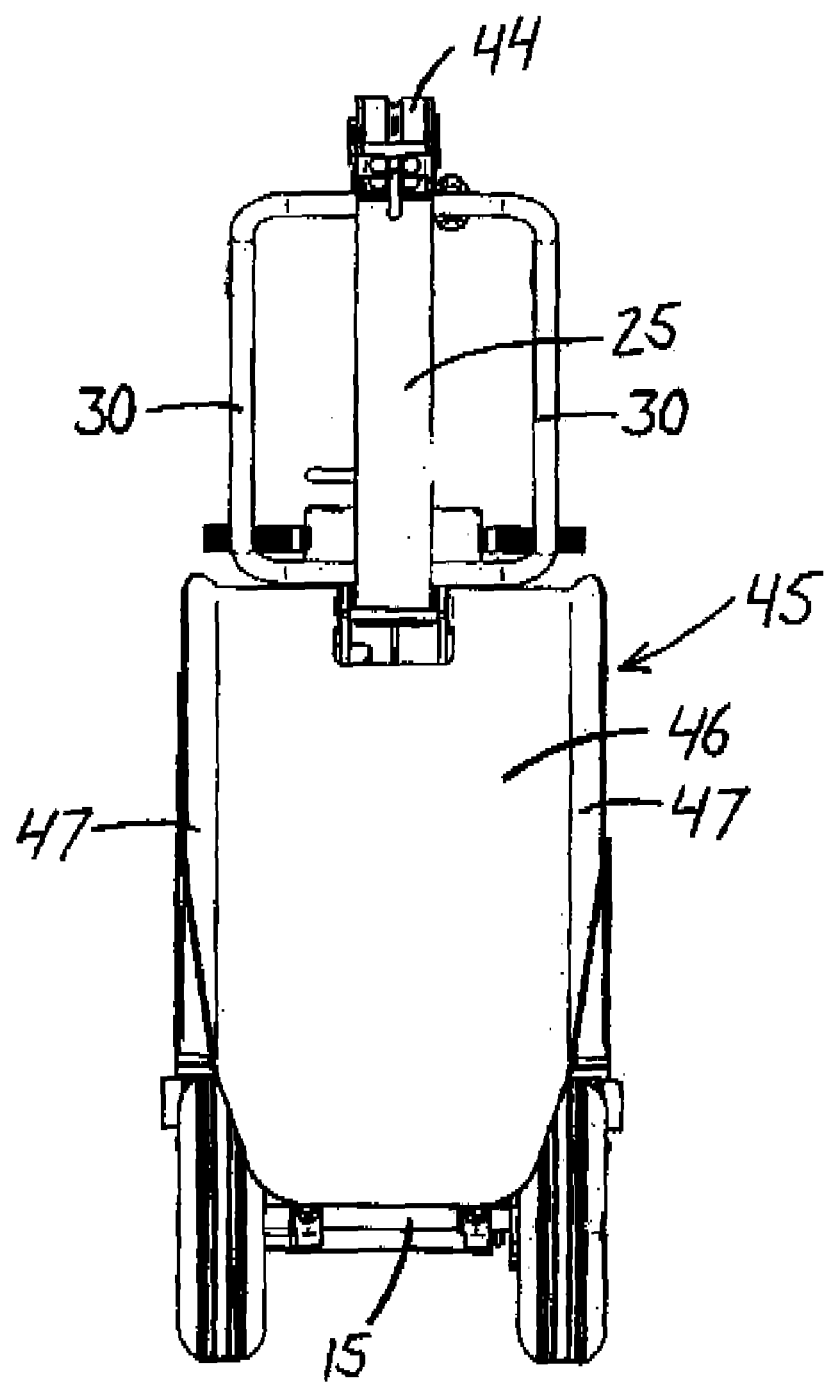
FIG. 5 is a front elevational view of the cart in a position of FIG. 1.

The arms 18 and 19 as best shown by a comparison of FIGS. 4 and 7 provide a parallelogram linkage with the arms pivoted at their forward end on pivot pins 65 on the plate 13 and at the rearward end on pivots 66 on the plate 52. A transverse link 67 extends across the arms and co-operates with a lock arm 68 which is manually operable to co-operate with a notch in the link 67. Thus in a center position, the lock arm 68 engages into a notch or hole in the link 67 to hold the arms 18 and 19 parallel and thus hold the rear frame directly behind the front frame.

When the latch arm 68 is released, the parallel linkage defined by the arms 18 and 19 can pivot to either side as controlled by the operator. The movement to one side is shown in FIG. 7 at which the rear frame can be locked in a position to one side as shown by engagement of the lock arm 68 in an opening 70 in the link 67. A symmetrical opening 71 is provided in the link 67 on the opposite side to allow the parallel linkage to move to and be locked at the opposite side in symmetrical manner to that shown in FIG. 7.

The movement on the parallel linkage causes the rear frame to move to one side so that one of the castor wheels 50 is moved to a position significantly to one side of the adjacent drive wheel 16. This increases the wheel base of the cart in the side to side direction thus providing an increased balancing effect to accommodate loads tending to tilt the cart to one side. Symmetrical movement to the other side of course balances tilting movements tending to tilt to that side.

The parallel linkage also moves the rear frame forwardly to a position immediately behind the front frame. In this position the cart can move easily around tight corners where both the alley that the cart is leaving and the alley that the cart is entering are both relatively narrow. Particularly when withdrawing from lifting the load in a reverse direction, the rear frame section now leading can pass around the corner in advance of the front frame section with the corner of the alley projecting into the area in front of the rear frame section and to one side of the front frame section, and the rear frame section can be pivoted back to its straight ahead position after the corner has been negotiated.

Thus the side to side articulation of the rear frame allows both improved manoeuvrability and improved balance.

Figure 3:
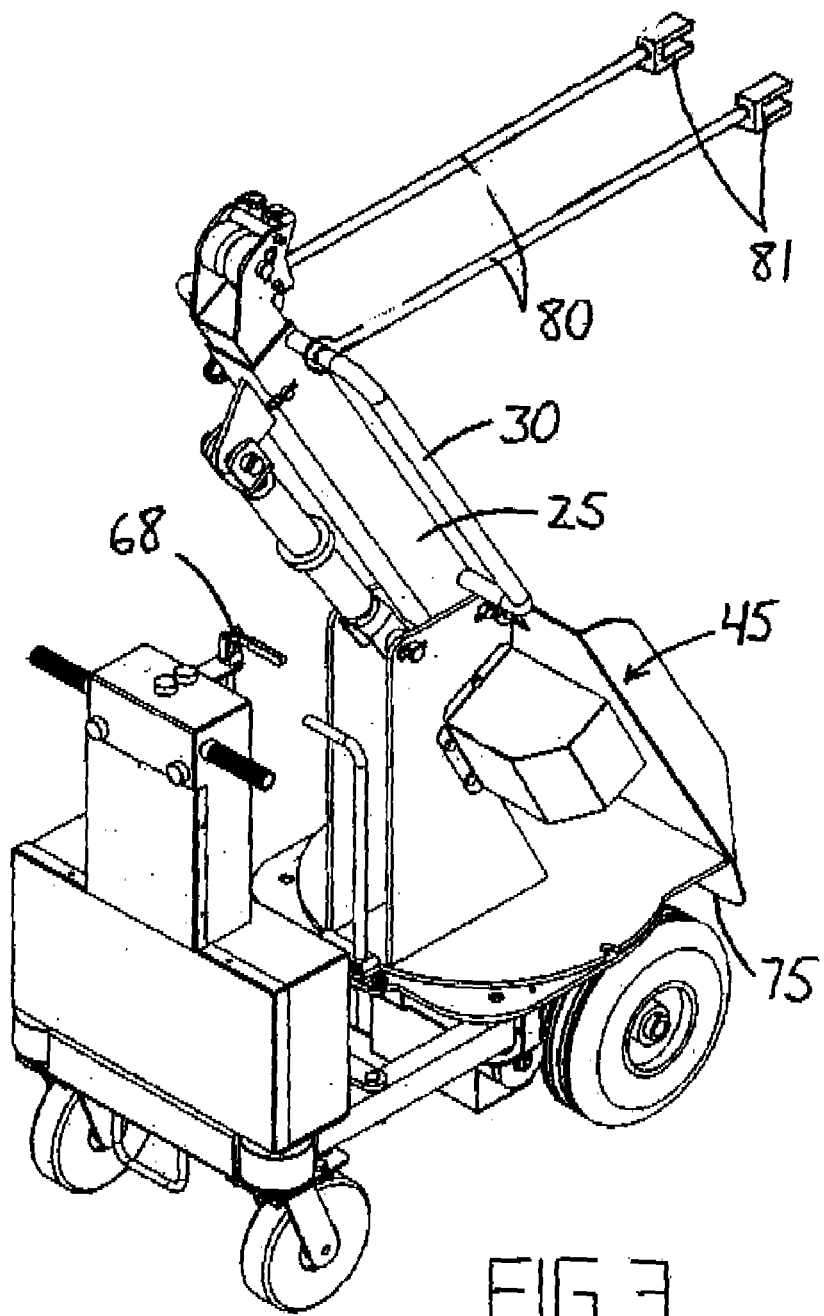
FIG. 3 is an isometric view similar to that of FIG. 1 showing the cart in a position for lifting an animal in the straight ahead position.

The rear frame further includes a footstep 73 attached to the bottom of the rail 53 so that the operator can place a foot onto the footstep and apply the weight of the operator onto the rear frame thus further increasing the ballast effect of the rear frame when a lifting action is occurring. As shown in FIG. 3, the boom is moved to a retracted position so that it forms a straight line with the inclined panel 45. With the boom in the forwardly inclined position of FIG. 1, the cart can be moved straight ahead to an animal lying deceased on the ground and the winch can be operated to lift the animal. This causes the animal to slide over the slide panel and over a bottom edge 75 of the slide panel onto the slide panel and onto the other part of the boom including the side bars 25B. The boom can then be pivoted rearwardly into the position of FIG. 3. Thus the animal is supported for transportation in an inclined manner from the pulley at the top downwardly over the upper section of the boom and over the inclined slide panel with the weight of the animal resting upon this inclined surface and thus applied onto the lift mechanism over the front wheels 16. The cart can then be moved rearwardly by the operator controlling the cart using the control button and can be steered by the castoring action of the wheels 50, or by active steering if provided, so as to withdraw the cart with the animal carried thereon to a location for disposal. If necessary the boom can be moved to an extended position by extending the inner tube 25B before the lifting action proceeds.

As shown in FIG. 8, the cart can also be used for lifting action to one side in which case the rear frame 11 is moved to the one side position described above and the lifting mechanism 20 is rotated on its platform to one side thus providing a stable structure with a wide wheel base with the outer most wheel 50 well in front of the inclined slide panel 45. Thus a lifting action can be effected with the vehicle well balanced lifting either a deceased animal or lifting other articles as required.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A transportation cart for lifting a dead animal or other object comprising:
    a cart frame;
    at least three ground wheels for stably carrying the frame for movement over a ground surface;
    at least one of the wheels being steerable for steering the cart to a required location;
    the frame and said at least one of the round wheels being arranged for the movement and the steering to be operated by an a operator walking with the frame;
    a lifting mechanism on the frame for lifting the animal or other object from the ground to a raised position;
    the lifting mechanism comprising a lift support base mounted on the cart frame for rotational movement about a vertical axis through at least 180 degrees from one side of the cart frame to the other side of the cart frame so as to allow lifting from a position at said one side of the cart frame from a central position on the cart frame and from a position at said other side of the cart frame;
    the lifting mechanism comprising a generally upstanding mast mounted on the support base so as to stand upwardly therefrom and a boom having an inner end mounted on the mast for pivotal movement about a transverse axis such that an outer end of the boom can be raised and lowered;
    the lifting mechanism including a winch having a cable extending to the outer end of the boom so as to depend therefrom for lifting the animal or object from the outer end of the boom;
    the boom being movable from a lowered position extending outward from the frame to a raised position standing substantially vertically upwardly from the mast such that the animal or object when suspended from the outer end of the boom lies along one side of the boom and along one side of the mast so as to be stably carried over the cart frame.

2. The cart according to claim 1 wherein the lift support base comprises a horizontal platform which is mounted on a horizontal base for sliding rotation about said vertical axis.

3. The cart according to claim 1 wherein the lift support base is lockable in three positions including said central position and said two side positions.

4. The cart according to claim 1 wherein the lift support base is rotatable manually.

5. The cart according to claim 1 wherein there is provided a slide panel mounted on the support base for rotation therewith about the vertical axis and inclined downwardly and outwardly from said one side of the mast toward a side of the frame, the slide panel being arranged to receive a side of the animal or other object lying a against the panel when the animal or other object is suspended from the boom.

6. The cart according to claim 5 wherein the slide panel is pivotal from a lowered operating position below the boom to a raised stored position attached to an underside of the boom so as to be movable therewith.

7. The cart according to claim 1 wherein the boom is pivotal by actuation of a hand crank.

8. The cart according to claim 1 wherein the boom is pivotal by actuation of a screw.

9. The cart according to claim 1 wherein the frame includes a front frame section on which the lifting mechanism is mounted and a rear frame section and there is provided a coupling between the front frame section and the rear frame section for providing side to side movement of the rear frame section relative to the front frame section.

10. The cart according to claim 9 wherein the coupling comprises a parallel linkage defined by a pair of arms connected between the front and rear frame sections which pivot side to side.

11. The cart according to claim 9 wherein the coupling is lockable in three positions defining a center position in which the rear frame section is aligned behind the front frame section and two respective side positions.

12. The cart according to claim 9 wherein the front frame section is supported on two front wheels each on a respective side of a center line and the rear frame section is supported on two rear wheels each on a respective side of a center line.

13. The cart according to claim 12 wherein the front wheels are motor driven wheels.

14. The cart according to claim 12 wherein the rear wheels are castor wheels.

15. The cart according to claim 9 wherein there are provided electric power batteries carried on the rear frame section for ballast.

16. The cart according to claim 9 wherein the rear frame section includes a foot step on which an operator can place weight for applying ballast.

17. A transportation cart for lifting a dead animal or other object comprising:
    a cart frame;
    at least three ground wheels for stably carrying the frame for movement over a ground surface;
    at least one of the wheels being steerable for steering the cart to a required location;
    the frame and said at least one of the ground wheels being arranged for the movement and the steering to be operated by an operator walking with the frame;
    a lifting mechanism on the frame for lifting the animal or other object from the ground to a raised position;
    the lifting mechanism comprising a lift support base mounted on the cart frame for rotational movement about a vertical axis through at least 180 degrees from one side of the cart frame to the other side of the cart frame so as to allow lifting from a position at said one side of the cart frame, from a central position on the cart frame and from a position at said other side of the cart frame;
    the lifting mechanism comprising a generally upstanding mast mounted on the support base so as to stand upwardly therefrom and a boom having an inner end mounted on the mast for pivotal movement about a transverse axis such that an outer end of the boom can be raised and lowered;
    the lifting mechanism including a winch having a cable extending to the outer end of the boom so as to depend therefrom for lifting the animal or other object from the outer end of the boom;

wherein there is provided a slide panel mounted on the support base for rotation therewith about the vertical axis and inclined downwardly and outwardly from said one side of the mast toward a side of the frame, the slide panel being arranged relative to the mast and the boom to receive a side of the animal or other object lying against the panel when the outer end of the boom is in a raised position and the animal or other object is suspended from the raised outer end of the raised boom.

18. The cart according to claim 17 wherein the slide and is movable from a lowered operating position below the boom to a raised stored position attached to an underside of the boom so as to be movable therewith.

19. The cart according to claim 17 wherein the slide panel comprises a generally planar center section and two upturned side edges for confining the animal or other object on the center section.

* * * * *